United States Patent [19]
Harman

[11] 3,863,776
[45] Feb. 4, 1975

[54] APPARATUS FOR TRANSFERRING DISCRETE LOADS TO OR FROM PALLETS
[75] Inventor: Frederick George Harman, Epping, England
[73] Assignee: The British Mathews Limited, Essex, England
[22] Filed: Apr. 11, 1973
[21] Appl. No.: 350,188

[30] Foreign Application Priority Data
Apr. 11, 1972 Great Britain............... 16736/72

[52] U.S. Cl................ 214/6 P, 214/6 M, 214/6 N, 214/301, 214/310
[51] Int. Cl............................................ B65g 57/26
[58] Field of Search...... 214/6 M, 6 P, 8.5 F, 8.5 H, 214/8.5 R, 301, 309, 310, 6 N

[56] References Cited
UNITED STATES PATENTS
| | | | |
|---|---|---|---|
| 2,730,279 | 1/1956 | Enock | 214/309 |
| 2,883,074 | 4/1959 | Boehl et al. | 214/6 P |
| 3,022,617 | 2/1962 | Miller et al. | 214/6 P |
| 3,278,047 | 10/1966 | Miller | 214/6 P |

FOREIGN PATENTS OR APPLICATIONS
| | | | |
|---|---|---|---|
| 1,547,449 | 11/1968 | France | 214/6 P |
| 1,122,308 | 9/1956 | France | 214/6 P |

*Primary Examiner*—Robert J. Spar
*Assistant Examiner*—Gary Auton
*Attorney, Agent, or Firm*—Browdy and Neimark

[57] ABSTRACT

Apparatus for transferring discrete loads to or from a pallet, comprising pallet infeed means for moving a pallet to a loading station, first and second load conveying means adapted to move numbers of discrete loads to or from respective first and second loading positions arranged on opposite sides of the loading station, load transfer means adapted to transfer loads simultaneously between each load conveying means at its loading position and a pallet at the loading station, and pallet discharge means for discharging the pallet from the apparatus. Two forms of the apparatus are described, one for loading cylindrical articles, such as kegs, on to a pallet, the other for removing such articles from a loaded pallet.

5 Claims, 5 Drawing Figures

APPARATUS FOR TRANSFERRING DISCRETE LOADS TO OR FROM PALLETS

FIELD OF INVENTION

This invention relates to apparatus for transferring discrete loads to or from pallets.

SUMMARY OF THE INVENTION

According to this invention there is provided apparatus for transferring discrete loads to or from a pallet, comprising pallet infeed means for moving a pallet to a loading station, first and second load conveying means adapted to move numbers of discrete loads to or from respective first and second loading positions arranged on opposite sides of the loading station, load transfer means adapted to transfer loads simultaneously between each load conveying means at its loading position and a pallet at the loading station, and pallet discharge means for discharging the pallet from the apparatus.

Preferably the infeed means and discharge means comprise respective horizontal infeed and discharge conveyors, the loading positions of the load conveying means are arranged at a distance above the infeed and discharge conveyors greater than the height of a loaded pallet, and pallet lift means are provided for raising a pallet from the infeed conveyor to a loading station at the same level as the loading positions of the conveying means and for lowering the pallet from the loading station to the discharge conveyor. Suitably, the infeed conveyor and discharge conveyor are collinear, and each load conveying means comprises a horizontal conveyor arranged at right angles to the infeed and discharge conveyors.

In one form of the invention there is provided apparatus for transferring discrete loads to a pallet, comprising pallet infeed means for moving an empty pallet to a loading station, first and second load conveying means adapted to move numbers of discrete loads to respective first and second loading positions arranged on opposite sides of the loading station, load transfer means adapted to move loads simultaneously from each load conveying means at its loading position onto a pallet at the loading station, and pallet discharge means for discharging a loaded pallet from the apparatus.

The apparatus may be used for transferring cylindrical articles, such as kegs or drums, onto pallets of the kind having a load-bearing surface shaped to support two rows of cylindrical articles lying on their curved surfaces. In that case, the load transfer means preferably comprise a pair of transfer members arranged one at each side of the pallet loading station and each pivotally mounted for rotation about a horizontal axis above the corresponding loading position, so that movement of the transfer member, in operation, pushes a number of cylindrical loads from the corresponding loading position onto a pallet at the loading station, the loads being so orientated on the load conveying means that they roll into position on the pallet. Suitably, each transfer member carries roller means, rotatable about a horizontal axis spaced from the axis of rotation of the transfer member, with which the loads are engaged during the transfer operation thereby to push the loads onto the pallet.

In another form of the invention there is provided apparatus for removing discrete loads from a pallet on which the loads are arranged in two adjacent rows, comprising pallet infeed means for moving a loaded pallet to a loading station, first and second load conveying means adapted to discharge discrete loads from respective first and second loading positions arranged on opposite sides of the loading station, load transfer means adapted to move each of the two rows of loads simultaneously from a pallet at the loading station onto the respective load conveying means, and pallet discharge means for discharging an empty pallet from the apparatus.

The apparatus may be used for removing cylindrical articles, such as kegs or drums, from pallets of the kind having a load-bearing surface shaped to support two rows of cylindrical articles on their curved surfaces. In that case, the load transfer means may comprise a pair of transfer members pivotally mounted for rotation about a horizontal axis above the loading station and arranged so that in one position thereof they project between the two rows of loads on a loaded pallet moved into the loading station, rotation of the transfer members causing each member to engage one of the rows of loads and push the load onto the adjacent load conveying means.

BRIEF DESCRIPTION OF THE DRAWING

The invention will now be described, by way of example, with reference to the accompanying drawings, in which.

DETAILED DESCRIPTION OF PREFERRED EMBODIMENT

Figure 1:
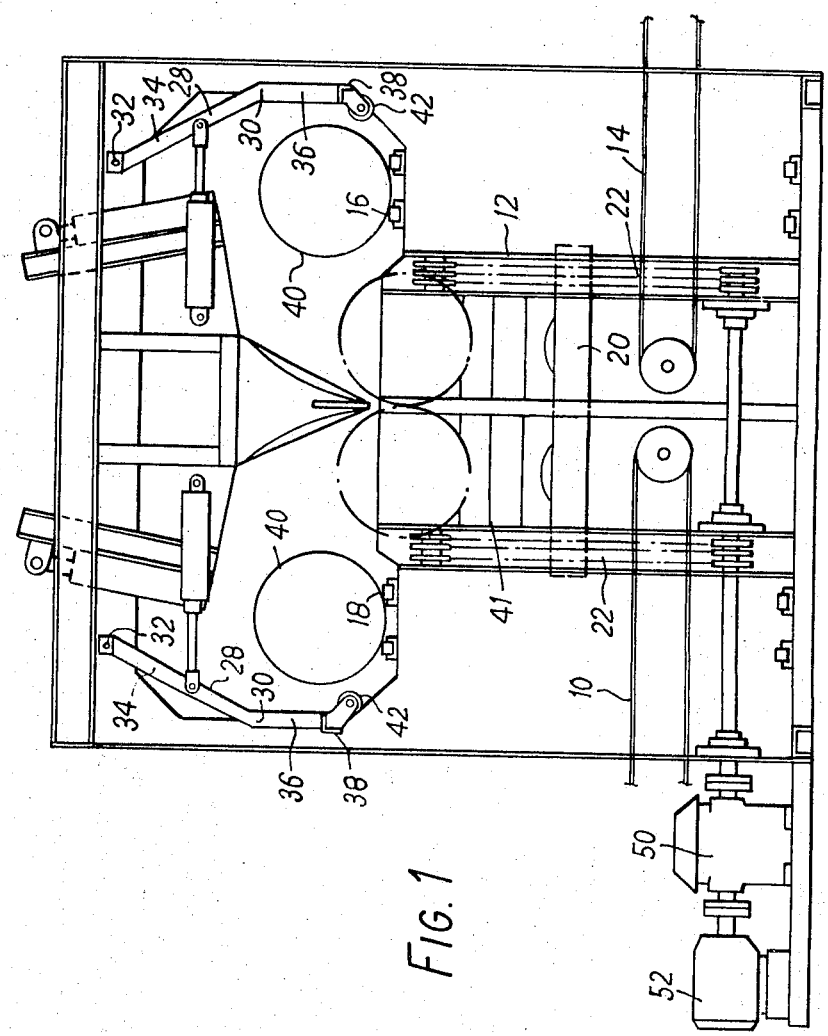
FIG. 1 is a diagrammatic end elevation of apparatus according to the invention for loading cylindrical articles onto pallets.
Figure 2:
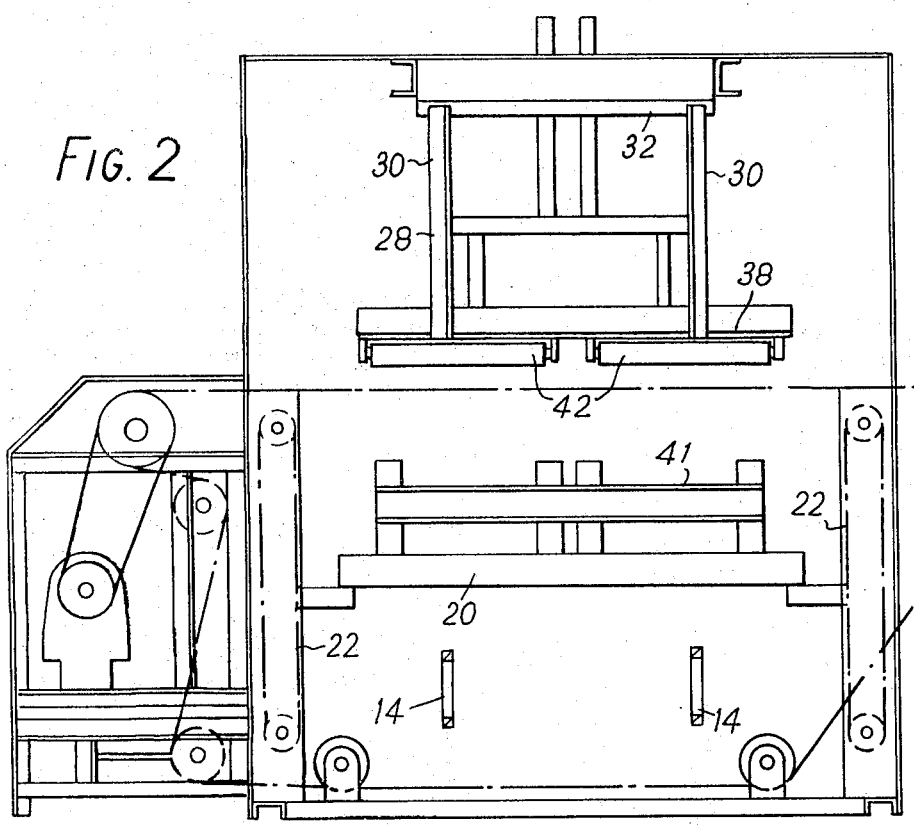
FIG. 2 is a diagrammatic side elevation of the apparatus of FIG. 1.

Referring to FIGS. 1 and 2, there is provided apparatus for loading cylindrical or generally cylindrical articles, such as kegs or drums, onto a pallet. The apparatus comprises a pallet infeed conveyor 10 for carrying empty pallets into a pallet lift unit 12, in which a pallet can be raised to a loading station, a discharge conveyor 14 for carrying loaded pallets from the lift unit 12, two load conveyors 16 and 18 for carrying loads to loading positions adjacent the lift unit, and transfer means for transferring loads from the load conveyors to a pallet at the loading station.

The apparatus is adapted for use with pallets of the kind having an upper surface shaped to support two rows of cylindrical articles lying on their curved surfaces, i.e. with their axes horizontal, each row containing two articles arranged end to end.

The pallet infeed conveyor 10 and discharge conveyor 14 are collinear and comprise horizontally disposed, driven chain conveyors, which extend into the pallet lift unit from opposite sides to points near the centre of the lift unit. The lift unit includes an H-shaped supporting frame 20 which is carried by two pairs of vertically arranged, endless chains 22 positioned at opposite sides of the lift unit 12 and driven through gearing 50 by an electric motor 52 so that frame 20 can be moved vertically in the lift unit to lift an empty pallet off the conveyors 10 and 14 and raise it to a loading station at the level of the load conveyors 16 and 18, and subsequently lower the loaded pallet onto the conveyors 10 and 14, the cross-member of the frame 20 at its lowermost position entering the gap between the ends of conveyors 10 and 14. FIGS. 1 and 2 show a pallet 41 supported on the frame 20 at an intermediate position of its travel.

Each load conveyor 16 and 18 comprises a horizontally disposed, driven chain conveyor arranged at right angles to the pallet infeed and discharge conveyors 10 and 14 and at a height above those conveyors sufficient to allow a loaded pallet to move freely beneath the load conveyors as it is discharged by conveyor 14 from the pallet lift unit 14. The two load conveyors 16 and 18 extend to loading positions on opposite sides of the pallet lift unit, so that loads carried on the conveyors to the loading positions are positioned adjacent opposite sides of a pallet raised to the loading station by the lift unit, as shown by loads 40 in FIG. 1.

Near the end of each load conveyor 16 and 18 is a back stop 24 (see FIG. 3) positioned to arrest movement of a load on the conveyor at the position corresponding to the position it is to take up on a pallet at the loading station. The position of the back stop 24 is adjustable so that it can be set for loads of different lengths. At a position on each load conveyor near to the centre line of a pallet at the lift station there is provided a retractable stop member 26 which, in operation, is raised by a suitable mechanism (not shown) after a first load has moved past it to the back stop 24, to arrest movement of the following load, so that the two loads are spaced by a desired amount before they are transferred to a pallet. The position of the retractable stop member 26 is adjustable to allow for loads of different lengths.

Mounted above each load conveyor 16 and 18, at its loading position, is a load transfer member 28, comprising a pair of arms 30 pivotally mounted at their upper ends about a horizontal axis 32 positioned above and parallel to the associated load conveyor. Each transfer arm 30 has a portion 34 which, in its inoperative position, extends downwards and outwards and is joined to a portion 36 extending vertically downwards to a point just above the level of the conveyor 16 or 18. The vertically disposed portion is positioned so that a load can be moved into position alongside the arm. Each pair of arms carries, at its lower end, a horizontal support member 38, on which are rotatably supported two rollers 42. The rollers have an axis of rotation parallel to the pivotal axis of the arm, and are arranged so that when the arms 30 are pivotally moved towards two cylindrical loads which have been moved to the loading position on the conveyor 16 or 18 each roller engages the adjacent load at points angularly spaced about 45° from the lowest points on the cylindrical surface of the load. Double-acting pneumatic rams 44 are connected beneath the frame of the lift unit 12 and each arm 30, to effect rotation of arms 30 about pivotal axes 30 thereby to engage loads on the conveyors 16 and 18 at the loading positions and push them off the conveyors onto a pallet at the loading station, and to retract the arms to their inoperative position.

Fixed above the pallet lift unit 12 is a horizontal bar 46 extending parallel to and midway between the load conveyors 16 and 18 and positioned so as to prevent loads pushed from either load conveyor from overshooting their position on the pallet during the transfer operation.

In operation of the apparatus, an empty pallet is carried by the infeed conveyor 10 into the pallet lift unit 12, where it is raised by the support frame 20 to the level of the load conveyors 16 and 18. At the same time loads are carried to the loading positions by the load conveyors 16 and 18 so that two loads are disposed at each side of the pallet. The transfer arms 30 are then operated simultaneously to push the four loads from the load conveyors 16 and 18 onto the pallet, the loads rolling on their curved surfaces during this movement. The loaded pallet is then lowered onto the discharge conveyor 14 and moved on that conveyor out of the lift unit 12, as the next empty pallet is moved into the lift unit. At the same time the transfer arms 30 are retracted so that further loads can be moved to the loading positions, and the cycle is repeated.

It will be appreciated that the apparatus can be provided with suitable control mechanism, including sensing devices, e.g. photoelectric sensing devices, to sense the positions of pallets and loads at various stages in the operating cycle, so that the apparatus can operate automatically.

Since loads can be supplied to the apparatus along two load conveyors, and the two rows of loads are transferred simultaneously to the pallet, the apparatus enables pallets to be loaded rapidly and thus can handle a large number of pallets per hour.

Figure 4:
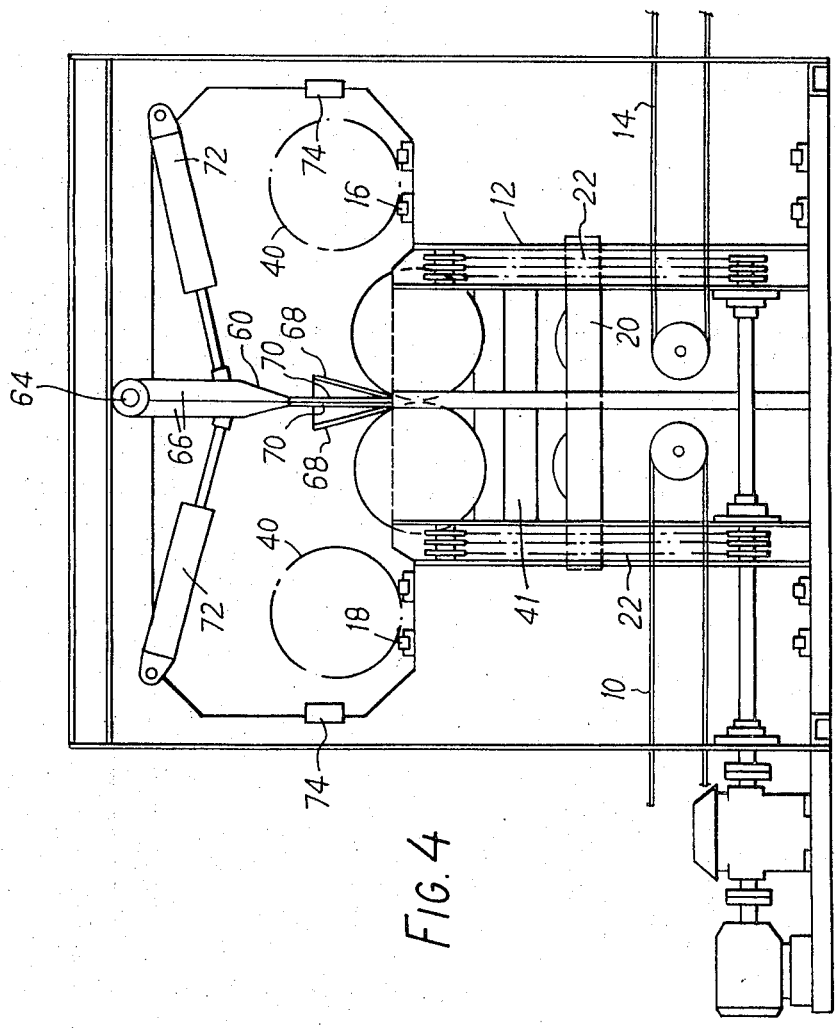
FIG. 4 is a diagrammatic end elevation of apparatus according to the invention for unloading cylindrical articles from pallets.
Figure 5:
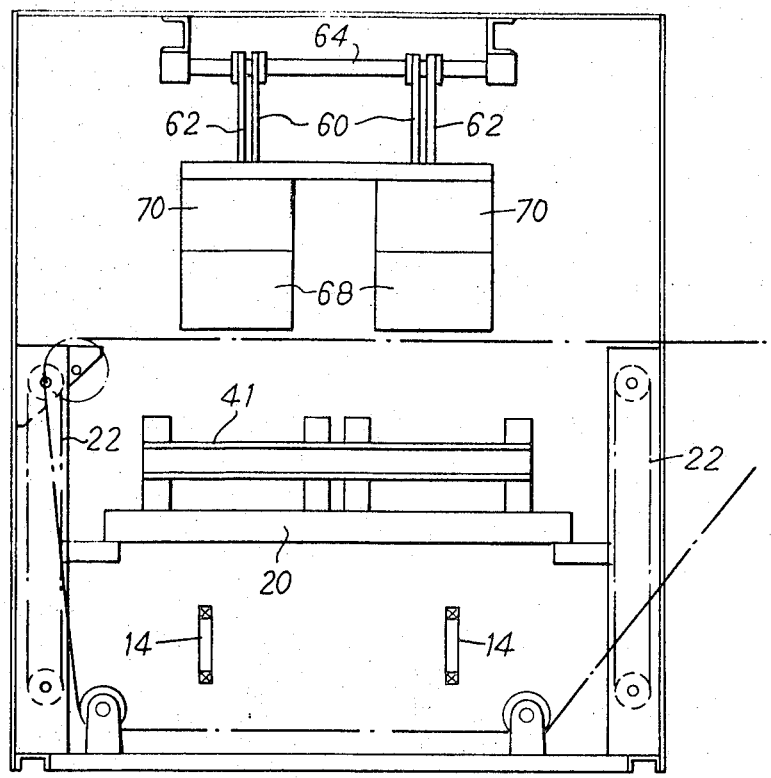
FIG. 5 is a diagrammatic side elevation of the apparatus of FIG. 4.

FIGS. 4 and 5 show an apparatus for removing cylindrical or generally cylindrical articles, such as kegs or drums, from pallets of the kind having an upper surface shaped to support two rows of the articles lying on their curved surfaces.

Figure 3:
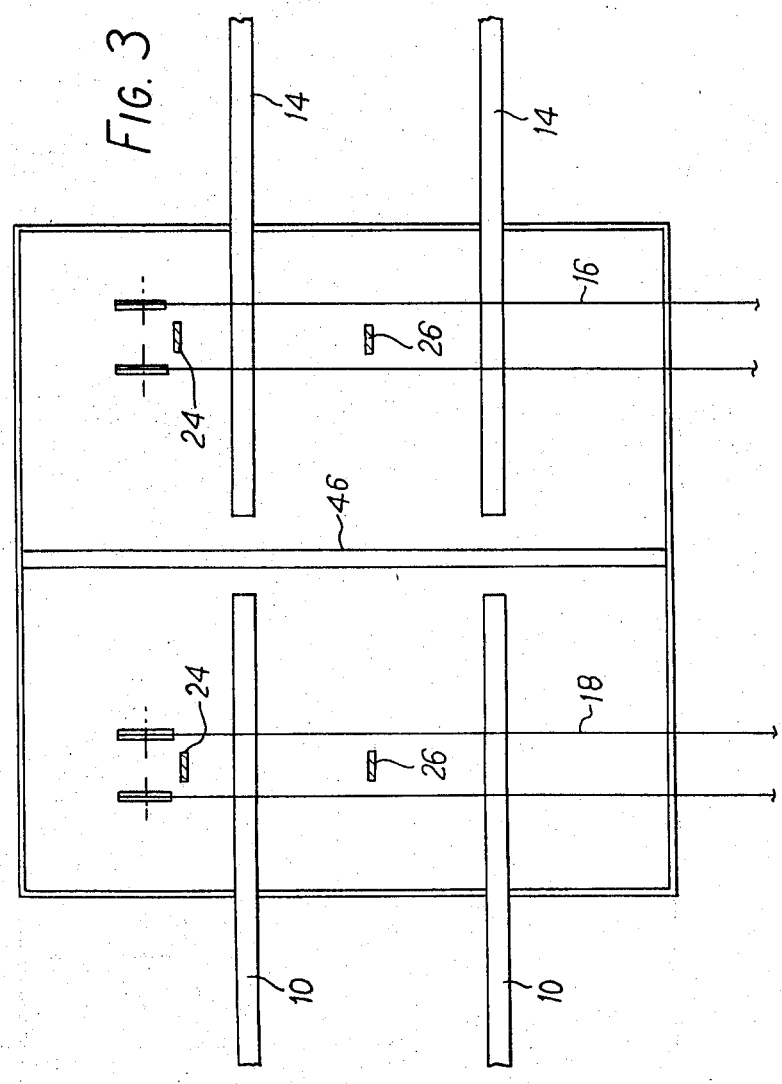
FIG. 3 is a plan view showing diagrammatically the arrangement of various conveyors of the apparatus of FIGS. 1 and 2.

The apparatus includes pallet infeed and discharge conveyors 10 and 14, a pallet lift unit 12, and two load conveyors 16 and 18 arranged as in the apparatus of FIGS. 1 to 3. However, the stop members 24 and 26 associated with the load conveyors and the centrally disposed horizontal bar 46 are dispensed with, and the transfer mechanism 28 is replaced with a stripping transfer mechanism for removing loads from a pallet raised in the pallet lift unit, as will now be described.

The stripping transfer mechanism comprises two pairs 60 and 62 of transfer arms pivotally mounted on a common shaft 64 the axis of which is positioned horizontally above the lift unit 12 and parallel to and midway between the two load conveyors 16 and 18. Each transfer arm comprises a lever arm 66 rotatably carried on shaft 64, a plate 70 fixed to the lever arm 66 at its lower end, plate 70 being vertical in the inoperative position of the arm, and an inclined, load-engaging plate 68 fixed to the plate 70. The transfer arms 60 and 62 are arranged so that in their inoperative position the plates 70 of adjacent arms 60 and 62 lie against one another and the corresponding plates 68 of the two transfer arms together form a downwardly tapering element which becomes positioned between two loads on a pallet as it is raised on frame 20 to the loading position. Double-acting pneumatic rams 72 are connected between fixed points on the frame of the apparatus and each lever arm 66 to effect rotation of the transfer arms, movement of the arms away from each other and from their inoperative position causing each plate 68 to engage a load on the pallet and push it from the pallet to the adjacent load conveyor 16 or 18.

At the side of each load conveyor 16 or 18 remote from the lift unit 12 is fixed a horizontal bar 74 positioned to prevent articles pushed from a pallet from overshooting the load conveyor.

In operation of the apparatus, a loaded pallet supporting two rows, each of two cylindrical articles, is moved into the lift unit by the infeed conveyor 10. The pallet is raised by the support frame 20 of the lift unit 12 to the level of the load conveyors. The two pairs of transfer arms 60 and 62 are operated simultaneously to push the rows of articles onto the respective load conveyors 16 and 18, on which the articles are conveyed from the apparatus. The transfer arms are retracted, and at the same time the empty pallet is lowered onto the pallet discharge conveyor 14, on which it is discharged from the lift unit as the next loaded pallet is carried into the lift unit on the infeed conveyor 10.

As with the first described embodiment, suitable control mechanism can be provided to enable the apparatus to operate automatically.

It will be apparent that the simultaneous removal of two rows of loads from a pallet enables the apparatus to unload pallets rapidly, and thereby handle a large number of pallets per hour.

It will be appreciated that many modifications could be made in both described embodiments. For example, the pallet lift unit could be dispensed with, and the two load conveyors could be arranged at the same level as the pallet infeed and discharge conveyors, the load conveyors running parallel to, and on opposite sides of the infeed and discharge conveyors. This would have the disadvantage, however, of requiring a relatively complex system for supplying articles to, or discharging articles from, both side of the pallet infeed and discharge conveyors.

What is claimed is:

1. Apparatus for transferring a plurality of discrete loads to a pallet of the kind capable of receiving two parallel rows of the discrete loads, comprising:

pallet infeed means for moving an empty pallet to a loading station;

first and second conveying means to convey loads simultaneously to respective first and second loading positions on opposite sides of said loading station so that each loading position is occupied by a similar number of loads arranged in a single row parallel to and adjacent the position on the pallet in which the loads are to be supported by the pallet;

transfer means for acting simultaneously on the two rows of loads at said loading positions to push the loads simultaneously to their respective position on the pallet while the pallet is at said loading station;

means for actuating said transfer means so that the articles in each of said rows of loads are pushed simultaneously into position on the pallet; and pallet discharge means for discharging the loaded pallet from the apparatus.

2. Apparatus as claimed in claim 1, said apparatus being for loading cylindrical articles such as kegs onto pallets of the kind having a load-bearing surface shaped to support two parallel rows of cylindrical articles, the articles in each row lying with the axis of each of the articles being substantially horizontal and aligned with a plane defined by the load-bearing surface, in which said apparatus further includes:

each of said first and second load conveying means being arranged to move, to the associated loading position, a plurality of cylindrical articles arranged with their axes substantially horizontal and colinear and substantially parallel to the plane defined by the load-bearing surface of the pallet at said loading station; and said load transfer means comprises a pair of transfer members each adapted to engage the articles in one of said rows of loads at the loading positions and to push said articles in said row of loads so that said articles roll into position on the pallet, and means for simultaneously actuating said transfer members so that the articles in each of said rows of loads are pushed simultaneously into position on the pallet.

3. Apparatus as claimed in claim 2, in which each of said transfer members is pivotally mounted for rotation about a horizontal axis above the corresponding loading position and is provided at the free end thereof with means to engage the cylindrical surfaces of the articles at the loading position.

4. Apparatus as claimed in claim 3, in which each transfer member carries roller means, rotatable about a horizontal axis spaced from the axis of rotation of the transfer member, with which the loads are engaged during the transfer operation thereby to push the loads onto the pallet.

5. Apparatus as claimed in claim 1, in which a stop member is disposed between the two load conveying means in such a position as to prevent articles pushed onto a pallet by the transfer members from rolling beyond their required positions on the pallet.

* * * * *